United States Patent [19]
Tanner et al.

[11] Patent Number: 6,155,749
[45] Date of Patent: *Dec. 5, 2000

[54] SPORTS FIELD SOIL CONDITIONER

[75] Inventors: James D. Tanner, Northbrook; Mark E. Lewry, Libertyville, both of Ill.

[73] Assignee: Profile Products LLC, Buffalo Grove, Ill.

[ * ] Notice: This patent is subject to a terminal disclaimer.

[21] Appl. No.: 09/163,136

[22] Filed: Sep. 29, 1998

[51] Int. Cl.⁷ .......................................................... E02D 5/18
[52] U.S. Cl. ............................. 405/258; 106/900; 404/31; 405/263
[58] Field of Search ..................................... 405/258, 303, 405/128, 263; 404/31, 32; 501/80, 84; 502/84; 106/DIG. 2, 900; 71/64.13, 903, 64.03, 64.02

[56] References Cited

U.S. PATENT DOCUMENTS

| | | |
|---|---|---|
| 3,111,006 | 11/1963 | Caron . |
| 3,772,893 | 11/1973 | Eilers . |
| 4,704,989 | 11/1987 | Rosenfeld . |
| 4,822,420 | 4/1989 | Burkhardt et al. . |
| 4,824,810 | 4/1989 | Lang et al. . |
| 5,013,349 | 5/1991 | Tanaka . |
| 5,151,123 | 9/1992 | Kviesitis . |
| 5,175,131 | 12/1992 | Lang et al. . |

OTHER PUBLICATIONS

"USGA Recommendations for Green Construction", USGA Green Section Staff, "USGA Recommendation For A Method Of Putting Green Construction", pp. 1–2, Mar. 1993.

One page marketing flier from Eagle–Picher entitled "Dialoam diatomite Soil Conditioner—Keeps greens and tees lush and healthy".

Two-page marketing flier from Eagle–Picher entitled "Dialoam diatomite Soil Conditioner".

*Primary Examiner*—Dennis L. Taylor
*Attorney, Agent, or Firm*—Brooks & Kushman P.C.

[57] ABSTRACT

Porous calcined clay sports field conditioners exhibit excellent playability while also displaying excellent drainage, freedom from compaction, and moisture retention under hot, dry conditions. The conditioners are non-hydrating granulates of narrow particle size distribution and are preferably of a red to brown coloration.

23 Claims, No Drawings

SPORTS FIELD SOIL CONDITIONER

TECHNICAL FIELD

This invention relates generally to sports field conditioners used for constructing, amending, and top dressing athletic fields and more particularly to a non-swelling, porous calcined clay aggregate having a specific particle size distribution suitable for use thereas.

BACKGROUND ART

Athletic fields such as baseball fields, softball fields, soccer fields and football fields are subject to extraordinary demands. Heavy foot traffic, play during inclement weather and overuse lead to problems in effective field management. Additionally, the poor physical structure of soils (native and imported), improper construction techniques and improper maintenance magnify problems caused by these factors.

The most common problem in baseball and softball field maintenance is providing a skinned infield surface that is playable in all weather conditions. Furthermore, due to budget and manpower constraints, these infields must be easy to maintain. More than 80 percent of all activity during a game takes place in this area.

The majority of infields are constructed using a soil mix comprising sand, silt and clay. The percentages of sand, silt and clay in an infield mix varies across the world based on local soil sources. No standard exists for major league baseball or for softball.

Desirable characteristics for playability include the following: a smooth, level surface for running, sliding and fielding balls; a loose, friable surface having between ¼ inch and ½ inch of loose surface material that provides a cushioned surface for ball hops, running and sliding, and which exhibits relative freedom from skin abrasion due to sliding contact with the surface; a surface that does not become slippery when wet, i.e., one which can absorb light rains and provide surface drainage during heavy rains; a surface that drains well and dries out quickly in wet weather; a surface that does not dry, become hard, and crack during the hot summer months, i.e., a surface capable of retaining minimum moisture levels; a surface that is easy to scarify using a nail drag or other implement that reduces surface compaction.

During the last 30 years, an industry has developed which provides groundskeepers and coaches with materials and tools that help make infields playable. Universities and private industry have invested substantial amounts of money and time in attempting to understand infield maintenance and construction. Recently, governing bodies have been created in an attempt to standardize practices and to provide recommendations to groundskeepers and coaches.

The most common method of improving a skinned infield is to modify and top dress infield soils with amendments that absorb moisture and help the field remain loose and friable. There are several objectives to adding amendments to infields. Some products are more effective than others in meeting these objectives.

Common among the objectives are the following.

1. Mixed into the top 4 to 6 inches of skinned soil, the amendments absorb rain and other moisture from infield soils so that the field does not become muddy during rainy days.

2. Mixed into the top 4 to 6 inches of skinned infield soil, the amendments help prevent compaction by preventing infield soils from binding together.

3. Used as a light surface top dress, they provide a loose, level, smooth playing surface.

4. Used as a surface top dress, the amendments provide a loose surface suitable for diving and sliding into bases.

5. The amendments retain moisture during hot summer months to keep a field from drying out and becoming hard and difficult to maintain, while encouraging drainage.

6. They provide a brown to red color that gives a field a "major league" appearance.

Amendments which have been tried in the past include sand, cat litter, oil and grease absorbents, calcined diatomaceous earth and crushed aggregates including brick, limestone, sandstone, shale, etc. There are several properties that differentiate amendments. They include particle sizes, moisture absorption capability, color, and physical stability.

Sand has not proved to be an acceptable amendment in most cases. Because of its small particle size, at least 80 percent by weight of sand must be present in a soil structure to keep that soil from becoming compacted. Amounts less than 80 percent actually encourage compaction since the sand fills available pore space in the soil. Other properties that make sand less desirable include its negligible water absorption and retention capacity. While soils containing very high sand content generally drain rapidly, there are no pores to retain the residual moisture necessary to obtain optimum playability, especially during hot summer months.

Cat litter was one of the first materials tried by groundskeepers to absorb moisture on infields following a rain. Cat litter is a dried clay containing substantial amounts of sodium and/or magnesium bentonites or other clays which may exhibit massive swelling in the presence of water. Although these products absorb water, the water causes rehydration of the dried clay, which breaks down quickly into a wet clayey mass. It can be used effectively only one time to absorb moisture, and if used often, can produce a surface which is slippery when wet, and which contributes to poor drainage by clogging intergranular drainage passages. Because it breaks down easily, it is not used for top dressing infields to provide a consistent surface.

Oil and grease absorbents are similar to cat litter in that they are manufactured to absorb liquids one time. Oil and grease absorbents have a very wide particle size distribution and also rehydrate into a wet clay.

Materials such as calcined diatomaceous earth, many crushed sandstones, crushed limestone, and similar white or light-colored materials have seen little acceptance as soil amendments for skinned sports fields. None of these materials due to their color, are acceptable as top dressing. In addition, calcined diatomaceous earth is brittle, and rapidly breaks down. Crushed brick and shale have been touted as amendments, but have been found in the past to contribute to cuts and abrasion during sliding. Crushed brick, additionally, has less than the desired porosity. Both crushed brick and shale in conventional particle size distributions, have been shown to decrease soil drainage.

Ceramic aggregates used as heavy duty oil and grease absorbents offer some of the desirable characteristics for a soil amendment material. However, the color of most of these products is not suited for infields. Moreover, when used as top dressing, these materials have been shown not to perform satisfactorily. A brown to red colored product of the assignee of the present invention has achieved success as a soil amendment for skinned sports fields. However, playing performance and application performance are still in need of improvement.

It would be desirable to provide to the industry a porous amendment which is inexpensive, which promotes rapid drainage while exhibiting considerable water retention, which is of a uniform and acceptable red-brown color, which exhibits playing characteristics which render the amendment suitable not only as a below-surface additive, but for top dressing as well, which is non-swelling, and which is stable, i.e., resisting both physical and chemical break down, and in particular, hydration to fine clayey materials.

SUMMARY OF THE INVENTION

The present invention employs a calcined clay material having a unique and well defined particle size distribution as a soil amendment or top dress for skinned sports fields. The calcined product is prepared by calcining a material, most preferably an iron-containing smectite clay or iron-containing phyllosilicate, followed by granulating (crushing), screening, and dedusting. The soil amendment is fast draining yet retains residual moisture, does not cause soil compaction, and provides a surface of superior playability to existing products.

DESCRIPTION OF THE PREFERRED EMBODIMENTS

The soil amendments of the present invention are prepared by calcining a clay material. While numerous clays are feasible for use herein, those containing significant quantities of montmorillinite, and opal CT (cristobalite, tridymite) are preferred. Other Clays suitable are particularly the smectite clays such as bentonite, montmorillinite (as previously indicated), beidellite, nontronite, hectorite, saponite, attapulgite, and sepiolite. Phyllosilicates in general, are also useful. Non-limiting examples of the latter include antigorite, chrysolite, kaolinite, talc, pyrophylite, muscovite, biotite, lepidolite, margarite, and chlorite. Reference as to these and other clay minerals may be had to INTRODUCTION TO CERAMICS, W. D. Kingery, John Wiley & Sons, N.Y. ®1960, particularly pages 15–32, incorporated herein by reference, and SYSTEMATIC MINERALOGY PART IV, Chapter 13.

The clay raw materials must be capable of being calcined to form a stable product which is resistant to hydrolysis, and one which is capable of passing the sulfate soundness test as described herein. In order to form a red to brown product, it is preferred that the clay be iron-containing. The iron may be in numerous forms, including organically bound iron, but is preferably an oxide such as limonite, hematite, etc. Most clay materials are aluminum silicates and alkali and alkaline earth metal aluminosilicates, often containing iron and other transition metals.

A preferred clay is a clay containing between 10 and 50 percent montmorillinite, and 30 and 80 percent opal CT, with varying content of quartz, other clays, minerals, and impurities, as measured by x-ray diffraction. A more preferred clay contains from about 20 to about 35 percent montmorillinite, and about 45 to about 60 percent opal CT. Clay starting materials such as these have been found to produce a uniform, stable product having good porosity, yet being able to pass the sulfate soundness test.

The use of a raw material comprising 27 percent montmorillinite, 5 percent quartz, and 55 percent opal CT, has been found to be advantageous. During calcining, numerous clay materials are modified into other minerals. In the latter advantageous clay composition, for example, the calcined product contains about 1.4 percent montmorillinite, 27 percent illite, 7 percent quartz, and 42 percent opal CT by x-ray diffraction. The illite may include between 70 and 80 percent silicon dioxide, 5 and 15 percent aluminum oxide, and 2 and 8 percent ferric oxide. Preferably the illite composition is 74 percent silicone dioxide, 11 percent aluminum oxide, and 5 percent iron as ferric oxide.

Thus, the nature of the precursor clay is not critical as long as a porous calcined clay product is obtained which is capable of being crushed to the particle density and bulk density limitations described herein, and preferably one which allows for a deep red to brown and relatively uniform color to be obtained. The deep color is believed to be due to iron-containing minerals or organic matter, and thus iron-containing clays are preferred, as previously indicated. In addition to the foregoing properties, the calcined granules must not easily rehydrate, and must be stable granules, having a particle stability reflected by less than 15 percent degradation in the ASTM C-88 Sulfate Soundness Test, and preferably less than 12 percent degradation, on average, or less. The granules should preferably also exhibit less than 15% degradation in the Static Degradation test, a common test in the mineral arts. All these properties are easily measured by one of ordinary skill in the art, and thus suitable precursor clay materials can easily be selected.

The granules also advantageously have a total porosity of at least 30 percent, preferably at least 50 percent, and more preferably about 75 percent. Of the total porosity, it is preferred that at least 20 percent be capillary porosity, more preferably at least 35 percent, and most preferably about 50 percent, the percentage of capillary porosity expressed as a percentage of the total porosity also expressed as a percentage. Some materials, such as crushed brick, do not have the desired porosity. Moreover, crushed brick, in the past, has exhibited an abrasive nature which has been undesirable. However, the cost effectiveness of crushed brick is attractive if its abrasive nature and propensity for cuts could be eliminated.

Preferably, suitable precursors contain greater then 1% by weight iron as iron oxide, and enough iron, together with other colored oxides and color-imparting components, to produce a red-brown tone to the granules. The iron may be supplied as a component of the clay mineral, e.g., illite containing 5 weight percent iron oxide or may be contained in the finished products (after calcining) identified by the presence of about 3% illite, about 39% quartz, 3% calcite, 4.5% hermatite, 7.8% limonite, and 42% albite; may be supplied by adding pure or impure iron oxide or iron minerals to the clay precursor prior to calcining, or may be in the precursor clay in the form of iron-containing organic material, humus, or the like. By the term "iron-containing" is meant that the precursor clay will contain sufficient iron to impart a tone to the calcined granulates which ranges from red to brown or gold-brown, and shades inbetween.

The precursor clays are commonly mined from single deposits and crushed to rather fine particle sizes prior to calcining at temperatures ranging from about 540° C. to about 1100° C. (1000° F. to 2000° F.). The actual calcining temperature will depend upon the particular precursor clay and can be easily determined by one skilled in the art. In general, finer particle sizes than are customarily used for ceramics such as oil absorbent granules are employed, as these smaller particle sizes encourage formation of calcined granules having uniform color. If the calcining temperature for the particular precursor clay is too low, the granules will not pas the Sulfate Soundness test, or may rehydrate upon addition of water. If the temperature is too high, densification may occur and porosity will be lost. The product granules should have a pore size ranging from 0.1 $\mu$m to 100 $\mu$m, and should have a total porosity of at least 30 percent, preferably at least 50 percent. Porosity may be measured by standard porosimetry methods, or may be measured by water intake by the calcined granules.

During the calcining process, dehydration of the clay minerals occurs, and the mineral particles coalesce, agglomerate, and densify. Crystal grain growth may occur. The mineral content also changes during this process. The calcined product is cooled slowly, then broken up into generally angular granulates. These granulates are not suitable for use in the present invention due to the wide range of particle sizes. Rather, the granulate must be processed by screening or sieving to eliminate most and preferably substantially all particles larger than 2.0 mm; to substantially eliminate most granules having particle sizes of less than 0.85 mm, and in particular to reduce fine particulates having particle sizes less than 0.3 mm. Screening processes are well known, and can be used to provide any desired particle size distribution consonant with the particle sizes delivered to the screening apparatus. When the proper size distribution is obtained, the product may be, and preferably is, pneumatically dedusted to remove very fine particles. In the present invention, the crushing and screening operations are conducted so as to prepare a final, substantially dust free granulate having the following particle size ranges.

TABLE 1

| PARTICLE SIZE | PERCENTAGE RANGE | PREFERRED RANGE | TYPICAL PERCENTAGE |
|---|---|---|---|
| >2.00 10 MESH | ≦15.0 | ≦10.0 | 8.4 |
| 0.85–2.00 mm 20 × 10 MESH | ≧60.0 | ≧70.0 | 81.5 |
| 0.60–0.85 mm 30 × 20 MESH | ≦17.5 | ≦10.0 | 8.5 |
| <0.60 mm 50 × 30 MESH | ≦7.0 | ≦5.0 | 1.5 |

It should be noted that the substantial majority of the particles, preferably 70 wt. % or more, are within the size range 0.85–2.0 mm. The mesh values below the size ranges indicate which mesh screen (left most, or lower value) will retain the particles in the particular size range, and the upper limit (right most mesh value) through which larger granulates will not pass. Thus, the lower limit of the first size range is 2.0 mm which the upper limit of the second size range is 2.0 mm. These values should be interpreted as having produced the size range by use of mesh screens of the stated sizes. Thus, there is no actual overlap between adjacent ranges.

It should be noted that the particle size distribution is not similar to that obtained by standard crushing and screening operations. For example, dried clay oil adsorbants have a very wide particle size distribution. Applicants have surprisingly found that the present inventions' particle size range uniquely satisfies the often conflicting demands of soil amendment particles. It has also been found, surprisingly, that when crushed brick is screened to the particle size propensity for cuts and abrasions which has characterized brick products in the past, and may be used successfully, although possessing less than the desired porosity, and thus not being an ideal top dressing material.

The assignee of the present invention has marketed a porous calcined clay product for 30 years, which is now sold under tradename Turface® MVP. Analysis of typical particle size ranges of this product and the soil amendment of the present invention is presented in Table 2 below:

TABLE 2

| PARTICLE SIZE | SUBJECT INVENTION SOIL AMENDMENT TYPICAL PERCENTAGE | TURFACE ® MVP TYPICAL PERCENTAGE |
|---|---|---|
| >2.00 mm 10 × 5 MESH | 8.4 | 55.8 |
| 0.85–2.00 mm 20 × 10 MESH | 81.5 | 40.1 |
| 0.60–0.85 mm 30 × 20 MESH | 8.5 | 3.5 |
| <0.60 mm 50 × 30 MESH | 1.6 | 0.6 |

Samples of the subject invention product were submitted to numerous groundskeepers at major league baseball parks. Three out of four professional groundskeepers currently use TURFACE® MVP as a soil amendment/top dressing. All were highly enthusiastic about the product produced in accordance with the subject invention.

What is claimed is:

1. In a process for constructing, maintaining, or grooming a skinned sports surface wherein a sports field conditioner is applied as a top dress, the improvement comprising:

selecting as said top dress a top dress comprising generally angular, porous, and non-hydrating calcined clay conditioner granules, said granules having particle sizes such that the following distribution, in weight percent, is obtained:

| particle size | % |
|---|---|
| >2 mm | ≦15.0 |
| 0.85–2 mm | ≧60.0 |
| 0.60–0.85 mm | ≦17.5 |
| <0.60 mm | ≦7.0 | said granules comprising the porous calcined product of a clay-containing material, said granules having a bulk density of between about 0.40 g/cm$^3$ to about 0.72 g/cm$^3$, and exhibiting less than 15% degradation in the sulfate soundness test, and applying said top dress to said sports field.

2. The process of claim 1, wherein said clay-containing material is an iron-containing smectite clay.

3. The process of claim 1, wherein said clay-containing material is a phyllosilicate clay-containing material.

4. The process of claim 1, wherein said granules have particle sizes such that the following distribution, in weight percent, is obtained:

| particle size | % |
|---|---|
| >2 mm | ≦10.0 |
| 0.85–2 mm | ≧70.0 |
| 0.60–0.85 mm | ≦10.0 |
| <.60 mm | ≦5.0 |

5. The process of claim 1 wherein said granules have a total porosity of 30 percent or more.

6. The process of claim 5 wherein capillary pore space constitutes minimally 20 percent of the total porosity.

7. The process of claim 1 wherein said smectite clay-containing material comprises montmorillinite and opal CT.

8. The process of claim 8 wherein said granules have a total porosity of 50 percent or more, of which 35 percent or more is capillary porosity, and which granules have a red to brown color, and exhibit less than 12 percent degradation in the sulfate soundness test.

9. The process of claim 1, wherein said calcined clay granules comprise crushed brick.

10. In a process for preparing a skinned sports surface by addition of soil thereto, the improvement comprising selecting as the soil, a soil containing, as a portion thereof, from about 5 volume percent to about 50 volume percent of a calcined clay sports field conditioner, wherein said calcined clay sports field conditioner comprises:

generally angular, porous, and non-hydrating calcined clay conditioner granules, said granules having particle sizes such that the following distribution, in weight percent, is obtained:

| particle size | % |
|---|---|
| >2 mm | ≦15.0 |
| 0.85–2 mm | ≧60.0 |
| 0.60–0.85 mm | ≦17.5 |
| <0.60 mm | ≦7.0 | said granules comprising the porous calcined porous product of a clay-containing material, said granules having a bulk density of between about 0.40 g/cm³ to about 0.72 g/cm³, and exhibiting less than 15% degradation in the sulfate soundness test, and applying said soil containing said calcined clay sports field conditioner to said skinned sports surface.

11. The process of claim 10, wherein said smectite clay is an iron-containing smectite clay.

12. The process of claim 10, wherein said granules have particle sizes such that the following distribution, in weight percent, is obtained:

| particle size | % |
|---|---|
| >2 mm | ≦10.0 |
| 0.85–2 mm | ≧70.0 |
| 0.60–0.85 mm | ≦10.0 |
| <0.60 mm | ≦5.0. |

13. The process of claim 10 wherein said granules have a total porosity of 30 percent or more.

14. The process of claim 10 wherein said clay-containing material is a phyllosilicate-containing material.

15. The process of claim 14 wherein capillary pore space constitutes minimally 20 percent of the total porosity.

16. The process of claim 11, wherein said granules comprise crushed brick.

17. A porous, calcined clay sports field conditioner suitable for use as an amendment or top dressing for skinned athletic surfaces, comprising:

the product obtained by calcining a precursor clay comprising one or more clays, said product comprising generally angular, porous, and non-hydrating calcined clay granules, said granules having particle sizes such that the following distribution, in weight percent, is obtained:

| particle size | % |
|---|---|
| >2 mm | ≦15.0 |
| 0.85–2 mm | ≧60.0 |
| 0.60–0.85 mm | ≦17.5 |
| <0.60 mm | ≦7.0 | said granules having a bulk density of between about 0.40 g/cm³ to about 0.72 g/cm³, and exhibiting less than 15% degradation in the sulfate soundness test.

18. The porous calcined clay sports field conditioner of claim 17, wherein said precursor clay is an iron-containing smectite clay.

19. The porous calcined clay sports field conditioner of claim 17, wherein said precursor clay comprises a phyllosilicate clay.

20. The porous calcined clay sports field conditioner of claim 17, wherein said granules have particle sizes such that the following distribution, in weight percent, is obtained:

| particle size | % |
|---|---|
| >2 mm | ≦10.0 |
| 0.85–2 mm | ≧70.0 |
| 0.60–0.85 mm | ≦10.0 |
| <0.60 mm | ≦5.0. |

21. The porous calcined clay sports field conditioner of claim 17 wherein said granules have a total porosity of 30 percent or more.

22. The porous calcined clay sports field conditioner of claim 21 wherein capillary pore space constitutes minimally 20 percent of the total porosity.

23. The porous calcined clay sports field conditioner of claim 17, comprising crushed brick.

* * * * *